United States Patent
Chen

(10) Patent No.: US 8,914,501 B2
(45) Date of Patent: Dec. 16, 2014

(54) METHOD, APPARATUS, AND SYSTEM FOR SCHEDULING DISTRIBUTED BUFFER RESOURCES

(75) Inventor: Pu Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 13/538,776

(22) Filed: Jun. 29, 2012

(65) Prior Publication Data

US 2012/0271943 A1   Oct. 25, 2012

Related U.S. Application Data

(63) Continuation of application No. PCT/CN2009/076361, filed on Dec. 31, 2009.

(51) Int. Cl.
*G06F 15/173* (2006.01)
*H04L 12/741* (2013.01)
*H04L 12/803* (2013.01)
*H04L 12/835* (2013.01)

(52) U.S. Cl.
CPC ........... *H04L 45/745* (2013.01); *H04L 47/122* (2013.01); *H04L 47/125* (2013.01); *H04L 47/30* (2013.01)
USPC ........................................ 709/224

(58) Field of Classification Search
USPC ........................................ 709/224
See application file for complete search history.

(56) References Cited

U.S. PATENT DOCUMENTS

| | | | |
|---|---|---|---|
| 6,490,615 B1 | 12/2002 | Dias et al. | |
| 2004/0133707 A1* | 7/2004 | Yoshiya et al. | 710/6 |
| 2005/0015566 A1* | 1/2005 | Zohar et al. | 711/203 |
| 2006/0107097 A1* | 5/2006 | Zohar et al. | 714/6 |
| 2008/0112420 A1* | 5/2008 | Wang et al. | 370/401 |
| 2008/0310302 A1* | 12/2008 | Detwiler et al. | 370/230 |
| 2009/0234917 A1* | 9/2009 | Despotovic et al. | 709/204 |
| 2011/0238828 A1* | 9/2011 | Grigsby et al. | 709/224 |

FOREIGN PATENT DOCUMENTS

| | | |
|---|---|---|
| CN | 1731742 | 2/2006 |
| CN | 1937557 | 3/2007 |
| EP | 1217795 A2 * | 6/2002 |
| JP | 10049387 A * | 2/1998 |

OTHER PUBLICATIONS

Stoica et al., Chord: A Scalable Peertopeer Lookup Service for Internet Applications., IEEE/ACM Transactions on Networking, vol. 11, No. 1, pp. 17-32, Feb. 2003.*

Rowstron et al., Pastry: Scalable, decentralized object location and routing for large-scale peer-to-peer systems., IFIP/ACM International Conference on Distributed Systems Platforms (Middleware), Heidelberg, Germany, pp. 329-350, Nov. 2001.*

(Continued)

*Primary Examiner* — Kostas Katsikis
(74) *Attorney, Agent, or Firm* — Brinks Gilson & Lione

(57) ABSTRACT

A method for scheduling distributed buffer resources is provided, where in the distributed buffer system, each buffer node is distributed on a virtual circle that is based on a consistent hashing algorithm, and the method includes: monitoring a load value of each buffer node in the distributed buffer system; judging whether a load exception exists in the current distributed buffer system according to the load value; and if the load exception exists in the current distributed buffer system, adjusting a layout of the buffer nodes in the distributed buffer system.

14 Claims, 8 Drawing Sheets

(56) References Cited

OTHER PUBLICATIONS

PCT International Search Report mailed Oct. 8, 2010, issued in related International Application No. PCT/CN2009/076361, Huawei Technologies Co., Ltd. (4 pages).
Jiang, Zijing, "Research for Multi-Term Query Method in a Three-Layer P2P System Model", Chinese Master's Theses Full-Text Database, Section 5.3, Dec. 15, 2009, 57 pages.
Swart, Garret, "Spreading the Load Using Consistent Hashing: A Preliminary Report", IEEE, Sections I-IV, 2004, 8 pages.
Office Action issued in corresponding Chinese Patent Application No. 200980118719.2, mailed Jul. 1, 2013, 11 pages.
Written Opinion of the International Searching Authority issued in corresponding PCT Patent Application No. PCT/CN2009/076361, mailed Oct. 8, 2010, 4 pages.
Jiang Zijing "Research for Multi-term Query Method in a Three-layer P2P System Model" Information Technology Section of China Master's Theses Full-text Database, Dec. 15, 2009, 57 pages.

* cited by examiner

METHOD, APPARATUS, AND SYSTEM FOR SCHEDULING DISTRIBUTED BUFFER RESOURCES

CROSS-REFERENCE TO RELATED APPLICATIONS

This application is a continuation of International Application No. PCT/CN2009/076361, filed on Dec. 31, 2009, which are hereby incorporated by reference in their entireties.

FIELD OF THE INVENTION

The present invention relates to the field of IT technologies, and in particular, to a method, an apparatus, and a system for scheduling distributed buffer resources.

BACKGROUND OF THE INVENTION

At present, a distributed buffer is a buffer technology universally used in the field of IT technologies, especially in the field of Web technologies, and the distributed buffer is mainly applied to, for example, Web page caching and database caching, to meet a requirement of a user for a response rate of a network system.

In a distributed buffer system, data of a buffer client needs to be distributed onto each buffer node through a specified load equalization algorithm. Currently, the most commonly used load equalization algorithm is a hash algorithm, and consistent hashing (Consistent Hashing) is an algorithm that is widely used among hash algorithms.

In a distributed buffer system based on the consistent hashing algorithm, all buffer nodes may be evenly distributed on a virtual circle structure ("circle" for short). When a general hash function is used, distribution of mapping points of a physical server is quite uneven. Several virtual nodes (for example, 100-200) may be allocated for each physical server through a method of setting virtual nodes. As the 100-200 virtual nodes are evenly distributed on the "circle" and coverage of each virtual node is small, an effect of equalizing loads on different buffer nodes is achieved. However, as a great number of the virtual nodes need to be set, the computation amount of the buffer client is huge, which increases a burden of the buffer client. Meanwhile, when load imbalance further occurs in the "circle" distributed with the virtual nodes, timely adjustment on the loads on the buffer nodes cannot be achieved.

For a case that an overall load is too high or too low in the distributed buffer system, at present, there is no effective manner for scheduling resource distribution in the distributed buffer system.

SUMMARY OF THE INVENTION

Embodiments of the present invention provide a method, an apparatus, and a system for scheduling distributed buffer resources, so as to implement automatic scheduling of resource distribution in a distributed buffer system, and enable the resource distribution to be in a balanced state.

In order to achieve the foregoing objectives, embodiments of the present invention adopt the following technical solutions:

As to a first aspect of the invention, a method for scheduling distributed buffer resources is provided, where each buffer node in a distributed buffer system is distributed on a virtual circle that is based on a consistent hashing algorithm, and the method includes:

monitoring load values of buffer nodes in the distributed buffer system;

judging whether a load exception exists in the current distributed buffer system according to the load values of buffer nodes; and adjusting a layout of the buffer nodes in the distributed buffer system, if the load exception exists in the distributed buffer system.

A method for scheduling distributed buffer resources includes:

receiving a notification message sent by a buffer management apparatus, where the notification message includes location information of an old buffer node, where a buffer node to which a hash segment on the virtual circle belongs has changed from the old buffer node to a new buffer node after adjustment of a layout of buffer nodes in the distributed buffer system; and when data to be read by a buffer client does not exist on the new buffer node, visiting the old buffer node according to the location information of the old buffer node to acquire the data.

A buffer management apparatus is provided, where in a distributed buffer system where the buffer management apparatus is located, each buffer node in the distributed buffer system is distributed on a virtual circle that is based on a consistent hashing algorithm, and the buffer management apparatus includes:

a monitoring unit, configured to monitor load values of buffer nodes in the distributed buffer system;

a judging unit, configured to judge whether a load exception exists in the current distributed buffer system according to the load values of buffer nodes; and an adjustment unit, configured to adjust a layout of the buffer nodes in the distributed buffer system when the load exception exists in the current distributed buffer system.

A buffer node is provided, where in a distributed buffer system where the buffer node is located, each buffer node in the distributed buffer system is distributed on a virtual circle that is based on a consistent hashing algorithm, and the buffer node includes:

a receiving unit, configured to receive a notification message sent by a buffer management apparatus, where the message includes location information of an old buffer node, where a buffer node to which a hash segment on the virtual circle belongs has changed from the old buffer node to a new buffer node after adjustment of a layout of buffer nodes in the distributed buffer system; and an acquisition unit, configured to visit the old buffer node according to the location information of the old buffer node when data to be read by a buffer client does not exist on the new buffer node, to acquire the data.

A distributed buffer system includes a buffer management apparatus, and multiple buffer nodes, where the multiple buffer nodes in the distributed buffer system are distributed on a virtual circle that is based on a consistent hashing algorithm, and are configured to save data; and the buffer management apparatus is configured to monitor load values of the buffer nodes in the distributed buffer system, judge whether a load exception exists in the current distributed buffer system according to the load values of the buffer nodes; and if the exception exists, adjust a layout of the multiple buffer nodes.

In the method, the apparatus, and the system for scheduling distributed buffer resources provided by the embodiments of the present invention, when the load exception exists in the current distributed buffer system, the loads borne by different buffer nodes is changed by adjusting the layout of the buffer nodes, thereby implementing the automatic scheduling of the resource distribution in the distributed buffer system and enabling the resource distribution in the distributed buffer system to be in the balanced state.

BRIEF DESCRIPTION OF THE DRAWINGS

To illustrate the technical solutions according to the embodiments of the present invention or in the prior art more clearly, the accompanying drawings for describing the embodiments are introduced briefly in the following. Apparently, the accompanying drawings in the following description are only some embodiments of the present invention, and persons of ordinary skill in the art can derive other accompanying drawings from these accompanying drawings without creative efforts.

DETAILED DESCRIPTION OF THE EMBODIMENTS

The technical solutions of the present invention are clearly and fully described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

In a distributed buffer system based on a consistent hashing algorithm, all buffer nodes are distributed on a virtual circle structure ("circle" for short) according to hash values that respectively correspond to the buffer nodes, and the "circle" is generally generated and saved by a buffer management apparatus. The buffer management apparatus may be a buffer management node.

A segment of a data range (for example, a hash value range of 1000-20000 on the "circle") on the "circle" is referred to as a "hash segment".

In the distributed buffer system, a buffer client generally downloads information about all the buffer nodes on the "circle" from the buffer management apparatus, for the buffer client to perform a consistent hashing operation.

Under a general case, a direction from a key of data to a buffer node saving the data is used as a forward direction of the "circle", and may be clockwise or counterclockwise when being embodied on the "circle". In embodiments of the present invention, the clockwise direction defined as a forward direction is used as an example; that is to say, data on the "circle" may select the buffer nodes in a clockwise direction, and when reading the data, the buffer client may also seek a closest buffer node for operation in the clockwise direction of the "circle" according to a hash value corresponding to the key of the data.

Figure 1:
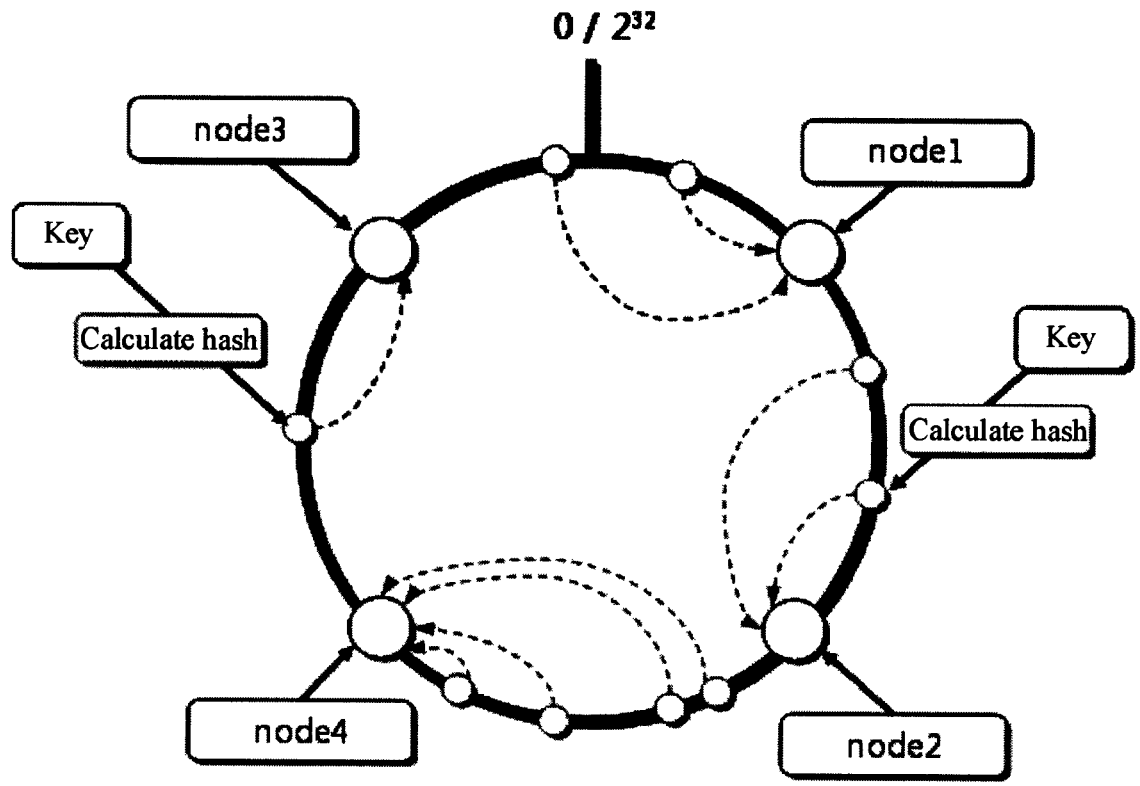
FIG. 1 is a schematic diagram of a principle for implementing a distributed buffer through a consistent hashing algorithm in the prior art.

With reference to FIG. 1, a basic principle for implementing a distributed buffer through the consistent hashing algorithm is substantially as follows.

First, multiple buffer nodes are configured onto a "circle" (continuum, the "circle" herein is a virtual circle generated by a load equalization device, which is essentially a continuum) of $0$-$2^{32}$. Herein, $2^{32}$ is only an example, and a size of the "circle" may definitely be another value. The method for configuring the buffer nodes onto the "circle" may be evenly arranging the multiple buffer nodes on the "circle", or may definitely be performing configuration with reference to other rules suitable for some specific scenarios.

Then, a hash value of a key corresponding to data that needs to be stored is evaluated, for example, through a md5 (Message-Digest Algorithm 5, message-digest algorithm 5) algorithm, a remainder of the calculated hash value to $2^{32}$ is taken; and the data that needs to be stored is mapped onto the "circle" according to a result of remainder taking.

Afterwards, clockwise searching is performed from a location where the key corresponding to the data that needs to be stored is mapped onto the "circle", and the data that needs to be stored is saved on a first found buffer node (server).

Multiple buffer nodes exist in the distributed buffer system, and loads borne by different buffer nodes are also different from each other in magnitude. Under a general case, a maximum value in multiple records of load data of a buffer node is used as a load value of the buffer node, for example, if a current memory use ratio of a buffer node is 50%, a bandwidth use ratio is 80%, and other load data is also less than 80%, the load value of the buffer node is 80%. If a load difference between a node with a maximum load and a node with a minimum load exceeds a threshold (for example, 15%), or an overall load of all the buffer nodes is higher than an upper limit (for example, 80%) or is lower than a lower limit (for example, 40%), it is considered that a load exception exists in the current distributed buffer system.

The method, the apparatus, and the system for scheduling distributed buffer resources provided in the embodiments of the present invention are described in detail below with reference to the accompanying drawings.

Embodiment 1

Figure 2:
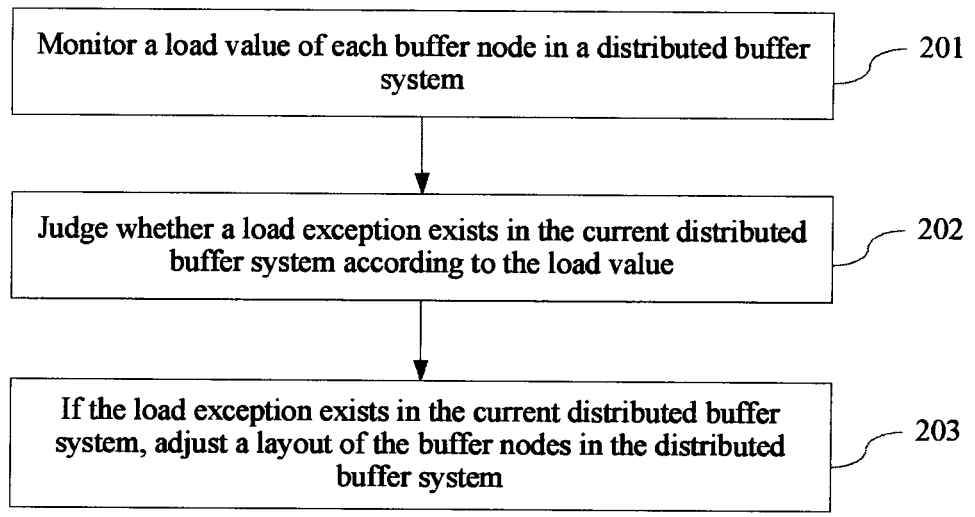
FIG. 2 is a flow chart of a method for scheduling distributed buffer resources according to Embodiment 1 of the present invention.

As shown in FIG. 2, a method for scheduling distributed buffer resources provided in this embodiment includes the following steps:

201: Monitor a load value of each buffer node in a distributed buffer system, where the load value may include, but is not limited to, a memory occupation ratio and a bandwidth occupation ratio of each buffer node.

202: Judge whether a load exception exists in the current distributed buffer system according to the load value, where the load exception includes load imbalance, overload, or underload.

Under a general case, if in the current distributed buffer system, a difference between a maximum value and a minimum value in load values of all buffer nodes exceeds a threshold (for example, 15%), it is considered that load imbalance exists in the current distributed buffer system.

If an overall load of all the buffer nodes is higher than an upper limit (for example, 80%) or a minimum value in the load values of all the nodes is higher than a preset value (for example, 60%), it is considered that the problem of overload exists in the current distributed buffer system, that is, the system is overloaded.

If the overall load of all the buffer nodes is lower than a lower limit (for example, 40%), it is considered that the problem of underload exists in the current distributed buffer system.

In this embodiment, the overall load of all the buffer nodes is expressed by an average of the load values of all the buffer nodes, or may definitely be expressed in another manner.

203: If the load exception exists in the current distributed buffer system, adjust a layout of the buffer nodes in the distributed buffer system.

In this embodiment, for the three cases of load exception, manners of adjusting the layout of the buffer nodes are respectively as follows:

1) In the case of load imbalance, coverage of the buffer nodes may be changed by shifting locations of the buffer nodes on the "circle", thereby changing the load values of the buffer nodes;

2) In the case of overload, a new buffer node may be added on the "circle", to share a load on an adjacent buffer node through the newly added buffer node; and 3) In the case of underload, one or multiple buffer nodes may be removed from the "circle", so that a load on the removed buffer node is transferred to an adjacent buffer node, thereby improving the overall load of the distributed buffer system.

An execution main body of the foregoing steps may be a buffer management apparatus, that is, a buffer management node in the distributed buffer system.

Figure 3:
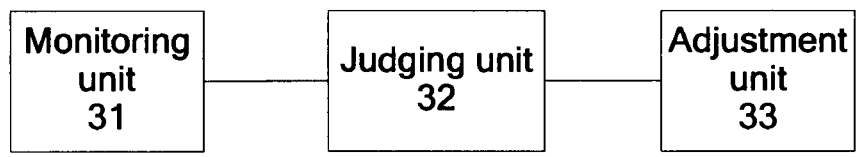
FIG. 3 is a schematic structural diagram of a buffer management apparatus according to Embodiment 1 of the present invention.

In order to implement the method better, this embodiment further provides a buffer management apparatus. As shown in FIG. 3, in a distributed buffer system where the buffer management apparatus is located, each buffer node is distributed on a virtual circle that is based on a consistent hashing algorithm, and the buffer management apparatus includes:

a monitoring unit 31, configured to monitor a load value of each buffer node in the distributed buffer system;

a judging unit 32, configured to judge whether a load exception exists in the current distributed buffer system according to the load value of each buffer node; and an adjustment unit 33, configured to adjust a layout of the buffer nodes in the distributed buffer system when the load exception exists in the current distributed buffer system.

The buffer management apparatus may be a buffer management node in the distributed buffer system.

In the method and apparatus for scheduling distributed buffer resources provided in this embodiment of the present invention, automatic scheduling of resource distribution in the distributed buffer system is implemented by monitoring the load value of each buffer node in the current distributed buffer system, and automatically adjusting the layout of the buffer nodes to change the loads borne by different buffer nodes when the load exception exists in the current distributed buffer system, so that the resource distribution of the distributed buffer system is in a balanced state.

Embodiment 2

Figure 4:
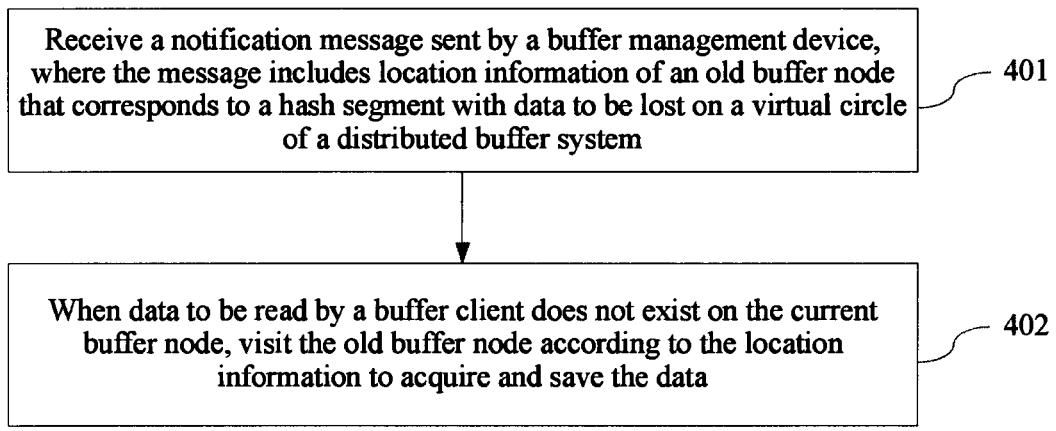
FIG. 4 is a flow chart of a method for scheduling distributed buffer resources according to Embodiment 2 of the present invention.

As shown in FIG. 4, a method for scheduling distributed buffer resources provided in this embodiment includes the following steps.

401: Receive a notification message sent by a buffer management apparatus, where the message includes location information of an old buffer node that corresponds to a hash segment with data to be lost on a virtual circle of a distributed buffer system.

where, the hash segment with data to be lost is a hash segment with a buffer node to which the hash segment belongs changed after adjustment of a layout of buffer nodes occurs on the virtual circle of the distributed buffer system.

402: When data to be read by a buffer client does not exist on a current buffer node, visit the old buffer node according to the location information to acquire and save the data.

An execution main body of the foregoing steps may be a buffer node in the distributed buffer system, and the buffer node is a new buffer node corresponding to the hash segment with data to be lost.

Figure 5:
FIG. 5 is a schematic structural diagram of a buffer node according to Embodiment 2 of the present invention.

In order to implement the method for scheduling distributed buffer resources better, this embodiment further provides a buffer node. As shown in FIG. 5, the buffer node includes a receiving unit 51, configured to receive a notification message sent by a buffer management apparatus, where the message includes location information of an old buffer node that corresponds to a hash segment with data to be lost on a virtual circle of a distributed buffer system; and an acquisition unit 52, configured to visit the old buffer node according to the location information when data to be read by a buffer client does not exist on a current buffer node, to acquire and save the data;

where, the hash segment with data to be lost is a hash segment with a buffer node to which the hash segment belongs changed after adjustment of a layout of buffer nodes occurs on the virtual circle of the distributed buffer system.

In the method and buffer node for scheduling distributed buffer resources provided in this embodiment, the location information of the old buffer node that corresponds to the hash segment with data to be lost is informed to the new buffer node corresponding to the hash segment with data to be lost, so that when it is found that the new buffer node does not have the data required by the buffer client, the new buffer node may visit the old buffer node according to the location information to acquire the corresponding data, thereby reducing losses of the data.

Embodiment 3

In this embodiment, a method for implementing resource scheduling in a distributed buffer system by shifting a location of a buffer node on a "circle" is further described through a specific example.

First, it is judged whether load imbalance exists in the current distributed buffer system, and the specific judging manner has been described in the foregoing and is not repeated herein. If the load imbalance exists in the current distributed buffer system, a layout of buffer nodes in the distributed buffer system may be adjusted by shifting a location of a buffer node on the "circle".

Figure 6:
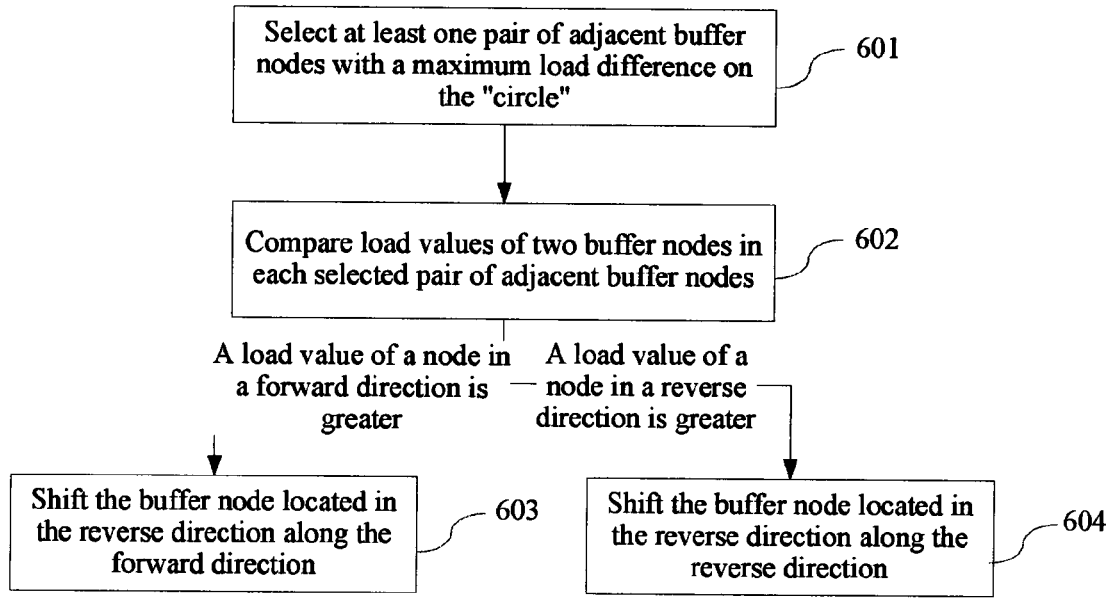
FIG. 6 is a flow chart of a method for shifting a location of a buffer node according to Embodiment 3 of the present invention.

Specifically, a procedure of shifting the location of the buffer node on the "circle" is as shown in FIG. 6, and includes:

601: Select at least one pair of adjacent buffer nodes with a maximum load difference on the "circle".

When the adjacent buffer nodes with the maximum load difference on the "circle" is selected, one pair with the maximum load difference may be selected, and this manner is comparatively suitable for a distributed buffer system with few buffer nodes; or multiple pairs of buffer nodes may be selected according to a descending order of load differences, and this manner is comparatively suitable for a distributed buffer system with more buffer nodes; definitely, another selection manner may also be used.

602: Compare load values of two buffer nodes in each selected pair of adjacent buffer nodes.

Taking one pair of adjacent buffer nodes as an example, if a load value of a buffer node located in a forward direction (clockwise) is greater, step 603 is performed; and if a load value of a buffer node located in a reverse direction (counterclockwise) is greater, step 604 is performed.

603: Shift the buffer node located in the reverse direction along the forward direction.

Figure 7:
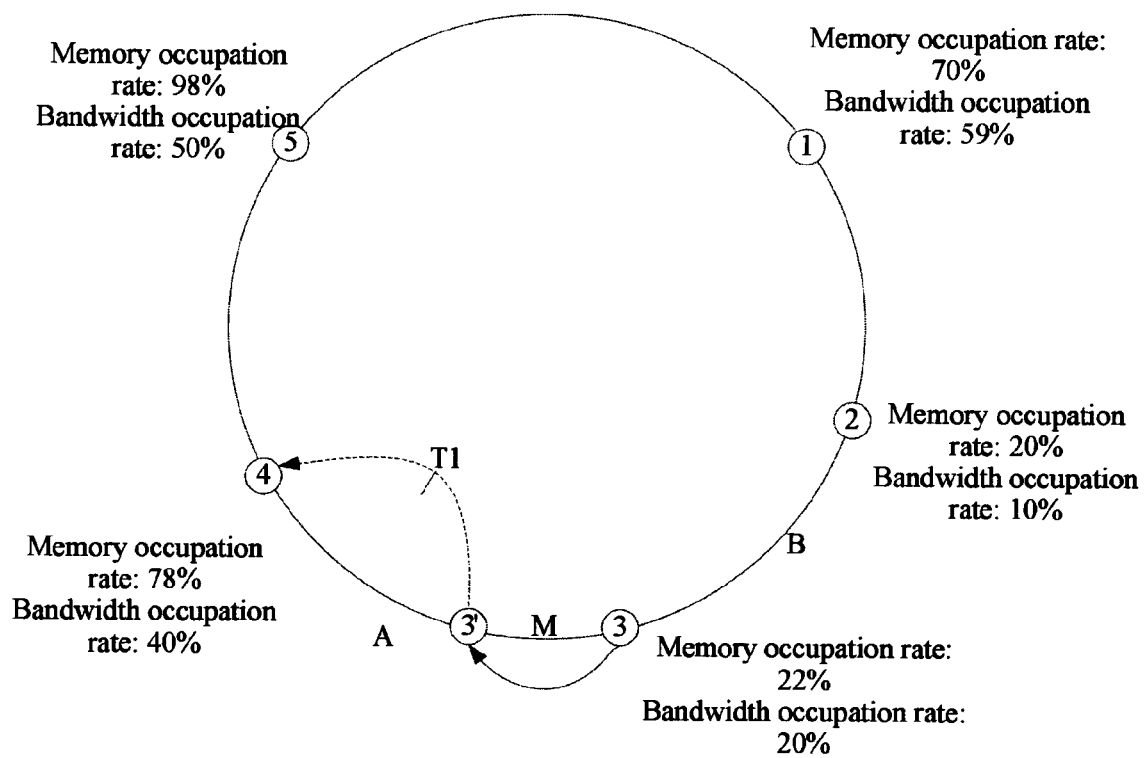
FIG. 7 is a first schematic structural diagram of a virtual circle of a distributed buffer system according to Embodiment 3 of the present invention.

Referring to a structure of a "circle" in a distributed buffer system shown in FIG. 7, a buffer node with a maximum load value is node 5 (98%), a buffer node with a minimum load value is node 2 (20%), and a load difference theretween is 78%, which is higher than a threshold (for example, 15%). Therefore, the load imbalance exists in the current distributed buffer system, and in this case, a pair of adjacent buffer nodes with the maximum load difference is node 3 and node 4. As a load value of node 4 is greater than that on node 3, node 3 needs to be shifted in the clockwise direction in order to equalize loads on node 3 and node 4.

If the current load value of node 4 is a, and length of a hash segment covered by node 4 is A; and the load value of node 3 is b, length of a hash segment covered by node 3 is B, and a load capacity of node 3 is X times of that of node 4 (the load capacity is related to a hardware condition of a node, and generally X>0; and if node 3 and node 4 use the same hardware or virtual hardware, X is 1), a distance by which node 3 is shifted in the clockwise direction on the "circle" is:

$$s = A \cdot \frac{X}{1+X} \cdot \frac{a-b}{a}.$$

In this manner, coverage of node 3 on the "circle" is widened, and the borne load is increased; at the same time, the load borne by node 4 is reduced, thereby equalizing the loads between node 3 and node 4.

604: Shift the buffer node located in the reverse direction along the reverse direction.

Figure 8:
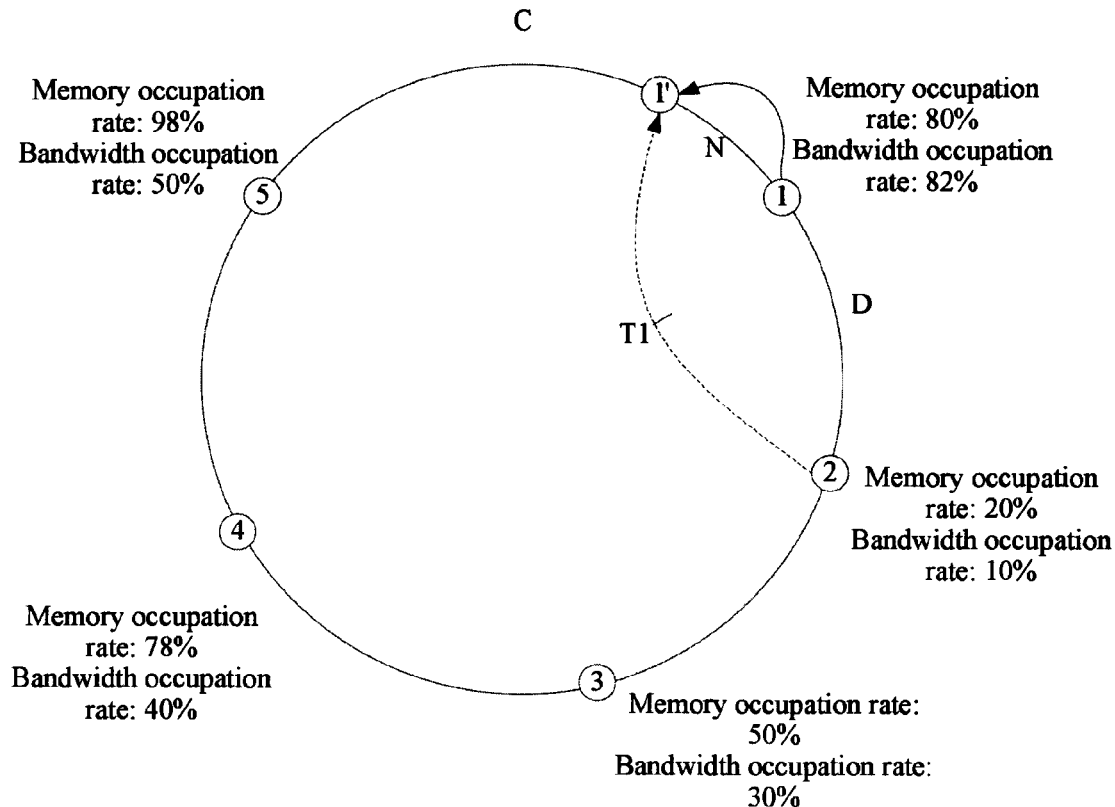
FIG. 8 is a second schematic structural diagram of the virtual circle of the distributed buffer system according to Embodiment 3 of the present invention.

Referring to a structure of a "circle" in a distributed buffer system shown in FIG. 8, in this case, a pair of adjacent buffer nodes with the maximum load difference is node 1 and node 2. As a load value of node 1 is greater than that on node 2, node 1 needs to be shifted in the counterclockwise direction in order to equalize loads on node 1 and node 2.

If the current load value of node 1 is c, and length of a hash segment covered by node 1 is C; and the load value of node 2 is d, length of a hash segment covered by node 2 is D, and a load capacity of node 2 is X times of that of node 1 (the load capacity is related to a hardware condition of a node, and generally X>0; and if node 1 and node 2 use the same hardware or virtual hardware, X is 1), a distance by which node 1 is shifted on the "circle" is:

$$s = C \cdot \frac{X}{1+X} \cdot \frac{c-d}{c}.$$

In this manner, coverage of node 1 on the "circle" is narrowed, and the borne load is reduced; at the same time, the load borne by node 2 is increased, thereby equalizing the loads between node 1 and node 2.

In the foregoing description, the method for equalizing the loads of the distributed buffer provided in this embodiment is introduced by taking one pair of adjacent buffer nodes as an example. If the problem of load imbalance still exists in the current distributed buffer system after the layout of the pair of adjacent buffer nodes is adjusted, the foregoing operations are repeated, till a difference between a maximum value and a minimum value in the load values of each of the buffer nodes in the distributed buffer system is lower than the threshold.

Through the method, the layout of the buffer nodes on the "circle" is adjusted, so that the total load in the whole distributed buffer system is re-distributed on each buffer node, thereby achieving the purpose of load equalization.

However, in the distributed buffer system, once the location of the buffer node is changed, a case in which data of a hash segment on the "circle" is lost when being visited may occur.

In view of this problem, in this embodiment, a buffer management apparatus sends a notification message to a new buffer node corresponding to the hash segment with data to be lost, where the notification message includes location information of an old buffer node that corresponds to the hash segment with data to be lost. The location information includes an IP (Internet Protocol) address and a port number of the old buffer node, and may definitely further include some other information for indicating the location.

With reference to the case in FIG. 7, node 3 is shifted in the clockwise direction of the "circle" to a location of node 3'. A hash segment M between node 3 and node 3' originally falls within coverage of node 4; and after node 3 is shifted, the hash segment M falls within coverage of node 3'. In this case, when requesting for acquiring data on the hash segment M, a buffer client initiates a read operation request to node 3; however, the data on the hash segment M is actually still saved in node 4 rather than node 3', and therefore the data on the hash segment M may be lost.

In this embodiment, after the location of node 3 is shifted, the buffer management apparatus in the distributed buffer system sends a notification message to node 3', where the notification message includes location information of node 4 (which generally refers to an IP address and a port number).

In this way, when the buffer client request for acquiring the data on the hash segment M from node 3', if the corresponding data does not exist in node 3', node 3' may visit node 4 according to the location information to acquire the corresponding data (for example, through a T1 interface shown in FIG. 7), saves the acquired data in node 3', and at the same time, returns the data to the buffer client initiating the read operation request.

The notification message may further carry timeout period information, and therefore the operation of node 3' visiting node 4 to acquire the data is restricted in the timeout period. If the operation of acquiring the data is still not completed after the timeout period is expired, node 3' stops the procedure of visiting node 4 to acquire the data.

Furthermore, a range (for example, 10001-20200) of the hash segment M may be added in the notification message; in this case, when the buffer client requests for acquiring the data from node 3' while the corresponding data does not exist in node 3', node 3' may perform a consistent hashing operation (an algorithm for performing the consistent hashing operation herein is the same as a consistent hashing algorithm saved in the buffer client) on a key of the data, and compares a hash value obtained through the operation with the range of the hash segment M carried in the notification message, to judge whether the hash value calculated by node 3' falls within the range of the hash segment M; and if yes, node 3' can visit node 4 to acquire the corresponding data. Through adding the range information of the hash segment M in the notification message, it may be further clarified that the data that node 3' needs to acquire from node 4 is the data corresponding to the hash segment M with data to be lost, rather than data of another hash segment, which may reduce signaling consumption and save resources.

In the foregoing description, the initiating, by the buffer client, the read operation request to node 3' is merely used as an example. If node 3' receives a count request, and a corresponding count value does not exist in the local node, a previously recorded count value may also be acquired by visiting node 4; and a basic principle of this processing procedure is the same as that of the procedure for processing the read operation request, which is not repeated herein.

With reference to the case in FIG. 8, node 1 is shifted in the counterclockwise direction of the "circle" to a location of node V. A hash segment N between node 1 and node 1' originally falls within the coverage of node 1; after node 1 is shifted, the hash segment N falls within coverage of node 2. In this case, when requesting for acquiring data on the hash segment N, the buffer client may initiate a read operation request to node 2; however, the data on the hash segment N is actually saved on node 1' (that is, the shifted node 1) rather than node 2, and therefore the data on the hash segment N may be lost.

In this embodiment, after the location of node 1 is shifted, the buffer management apparatus in the distributed buffer system sends a notification message to node 2, where the notification message includes location information of node 1' (which generally refers to an IP address and a port number). In this way, when the buffer client request for acquiring the data on the hash segment N from node 2, if the corresponding data does not exist in node 2, node 2 may visit node 1' according to the location information to acquire the corresponding data (for example, through a T1 interface shown in FIG. 8), saves the acquired data in node 2, and at the same time, returns the data to the buffer client initiating the read operation request.

The notification message may further carry timeout period information, and therefore the operation of node 2 visiting node 1' to acquire the data is restricted in the timeout period. If the operation of acquiring the data is still not completed after the timeout period is expired, node 2 stops the procedure of visiting node 1' to acquire the data.

Furthermore, a range (for example, 10001-20200) of the hash segment N may be added in the notification message; in this case, when the buffer client requests for acquiring the data from node 2 while the corresponding data does not exist in node 2, node 2 may perform a consistent hashing operation (an algorithm for performing the consistent hashing operation herein is the same as the consistent hashing algorithm saved in the buffer client) on a key of the data, and compares a hash value obtained through the operation with the range of the hash segment N carried in the notification message, to judge whether the hash value calculated by node 2 falls within the range of the hash segment N; and if yes, node 2 can visit node 1' to acquire the corresponding data. Through adding the range information of the hash segment N in the notification message, it may be further clarified that the data that node 3' needs to acquire from node 4 is the data corresponding to the hash segment N with data to be lost, rather than data of another hash segment, which may reduce signaling consumption and save resources.

In the foregoing description, the initiating, by the buffer client, the read operation request to node 2 is merely used as an example. If node 2 receives a count request, and a corresponding count value does not exist in node 2, a previously recorded count value may also be acquired by visiting node 1; and a basic principle of this processing procedure is the same as that of the procedure for processing the read operation request, which is not repeated herein.

In the method for scheduling distributed buffer resources provided in this embodiment, when load imbalance exists in the current distributed buffer system, the loads borne by different buffer nodes is changed by shifting the location of the buffer node on the structure of the virtual circle of the distributed buffer system, so that a load value difference between different buffer nodes is gradually reduced, thereby enabling the distributed buffer system to be in a load equalization state.

Moreover, this embodiment further provides a solution for reducing losses of buffered data, in which the location information of the old buffer node that corresponds to the hash segment with data to be lost is informed to the new buffer node corresponding to the hash segment, so that the new buffer node can visit the old buffer node according to the location information to acquire the corresponding data, thereby reducing cases of data loss.

Embodiment 4

In this embodiment, a method for implementing resource scheduling in a distributed buffer system by adding a buffer node to the distributed buffer system is further described through a specific example.

First, it is judged whether overload exists in the current distributed buffer system, and the specific judging manner has been described in the foregoing and is not repeated herein. If the overload exists in the current distributed buffer system, a layout of buffer nodes in the distributed buffer system may be adjusted by adding a buffer node on a "circle".

Figure 9:
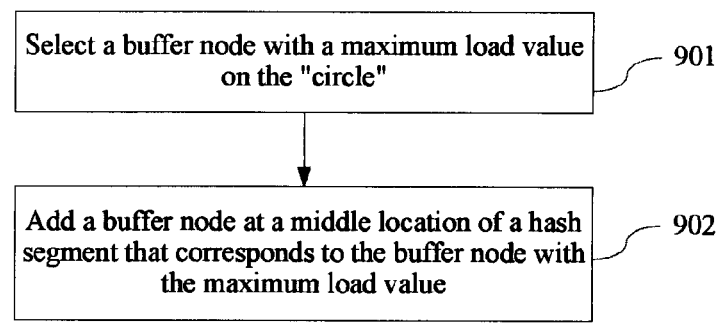
FIG. 9 is a flow chart of a method for adding a buffer node according to Embodiment 4 of the present invention.

Specifically, a procedure of adding a buffer node onto the "circle" is as shown in FIG. 9, and includes:

901: Select a buffer node with a maximum load value on the "circle", for example, node 5 in FIG. 10.

902: Add a buffer node at a middle location of a hash segment that corresponds to the buffer node with the maximum load value.

Figure 10:
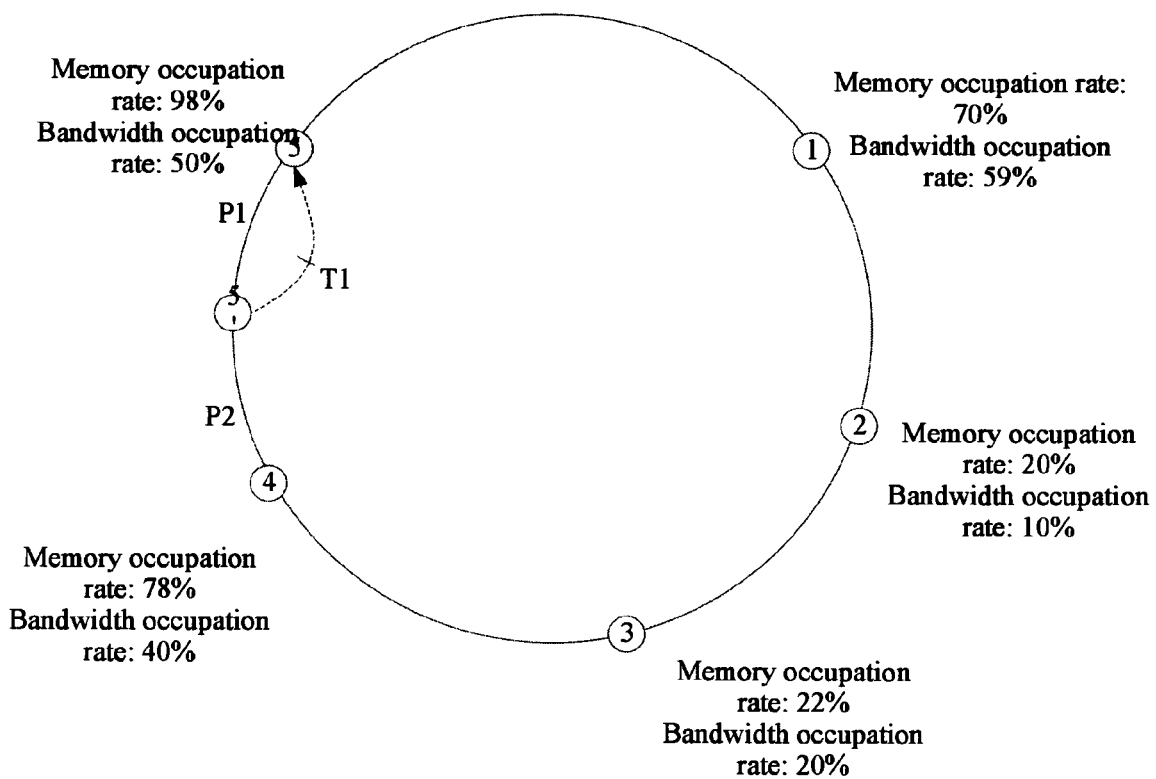
FIG. 10 is a schematic structural diagram of a virtual circle of a distributed buffer system according to Embodiment 4 of the present invention.

Referring to a structure of the "circle" in the distributed buffer system shown in FIG. 10, the buffer node with the maximum load value is node 5, and a hash segment covered by node 5 is a hash segment between node 4 located in a counterclockwise direction of node 5 and node 5. In this case, node 5' is added at a middle location of the hash segment covered by node 5. As node 5' is located in a counterclockwise direction of node 5, and precisely located at the middle location of the hash segment, node 5' equally divides the hash segment into two segments P1 and P2, so that the hash segment P1 still belongs to node 5, while the hash segment P2 belongs to node 5', thereby lowering a load on node 5, and lowering an average load of all the nodes in the current distributed buffer system at the same time.

If the overload problem still exists in the current distributed buffer system after one node is added onto the "circle", the foregoing operations may be repeated till an overall load in the distributed buffer system is lower than an upper limit.

Through the method, the new buffer node is added onto the "circle", so that the load on the buffer node whose load value is high originally may be shunted, thereby lowering the overall load of the distributed buffer system, and solving the problem of system overload.

In this embodiment, it should be noted that, before the buffer node is added, that a sufficient number of buffer node servers are in an on state (which may be in operation or standby) needs to be ensured first, and then the new buffer node can be added onto the structure of the virtual circle, to share a load on another buffer node.

However, in the distributed buffer system, once the layout of the buffer nodes is changed, a case in which data of a hash segment on the "circle" is lost when being visited may occur.

In view of this problem, in this embodiment, a buffer management apparatus sends a notification message to a new buffer node corresponding to the hash segment with data to be lost, where the notification message includes location information of an old buffer node that corresponds to the hash segment with data to be lost. The location information includes an IP address and a port number of the old buffer node, and may definitely further include some other information for indicating the location.

With reference to the case in FIG. 10, node 5' is added at the middle location of the hash segment between node 4 and node 5. The hash segment P2 between node 4 and node 5' originally falls within coverage node 5; and after node 5' is added, the hash segment P2 falls within coverage of node 5'. In this case, when requesting for acquiring data on the hash segment P2, a buffer client may initiate a read operation request to node 5; however, the data on the hash segment P2 is actually still saved in node 5 rather than node 5', and therefore the data on the hash segment P2 may be lost.

In this embodiment, after node 5' is added, the buffer management apparatus in the distributed buffer system may send a notification message to node 5', where the notification message includes location information of node 5 (which generally refers to an IP address and a port number). In this way, when the buffer client requests for acquiring the data on the hash segment P2 from node 5', if the corresponding data does not exist in node 5', node 5' may visit node 5 according to the location information to acquire the corresponding data, saves the acquired data in node 5', and at the same time, returns the data to the buffer client initiating the read operation request.

The notification message may further carry timeout period information, and therefore the operation of node 5' visiting node 5 to acquire the data is restricted in the timeout period. If the operation of acquiring the data is still not completed after the timeout period is expired, node 5' stops the procedure of visiting node 5 to acquire the data.

Furthermore, a range of the hash segment P2 may be added in the notification message; in this case, when the buffer client requests for acquiring the data from node 5' while the corresponding data does not exist in node 5', node 5' may perform a consistent hashing operation on a key of the data, and compares a hash value obtained through the operation with the range of the hash segment P2 carried in the notification message, to judge whether the hash value calculated by node 5' falls within the range of the hash segment P2; and if yes, node 5' can visit node 5 to acquire the corresponding data. Through adding the range information of the hash segment P2 in the notification message, it may be further clarified that the data that node 5' needs to acquire from node 5 is the data corresponding to the hash segment P2 with data to be lost, rather than data of another hash segment, which may reduce signaling consumption and save resources.

In the foregoing description, the initiating, by the buffer client, the read operation request to node 5' is merely used as an example, if node 5' receives a count request, and a corresponding count value does not exist in node 5', a previously recorded count value may also be acquired by visiting node 5; and a basic principle of this processing procedure is the same as that of the procedure for processing the read operation request, which is not repeated herein.

In the method for scheduling distributed buffer resources provided in this embodiment, when the overload exists in the current distributed buffer system, the loads borne by different buffer nodes is changed by adding the new buffer node, and an average load of all the buffer nodes is decreased, that is, an overall load of the distributed buffer system is decreased, so that the distributed buffer system is in a balanced state.

Moreover, this embodiment further provides a solution for reducing losses of buffered data, in which the location information of the old buffer node that corresponds to the hash segment with data to be lost is informed to the new buffer node corresponding to the hash segment, so that the new buffer node can visit the old buffer node according to the location information to acquire the corresponding data, thereby reducing cases of data loss.

Embodiment 5

In this embodiment, a method for implementing resource scheduling in a distributed buffer system by removing a buffer node from the distributed buffer system is further described through a specific example.

First, it is judged whether underload exists in a current distributed buffer system, and the specific judging manner has been described in the foregoing and is not repeated herein. If the underload exists in the current distributed buffer system, a layout of buffer nodes in the distributed buffer system may be adjusted by removing a buffer node on a "circle".

Figure 11:
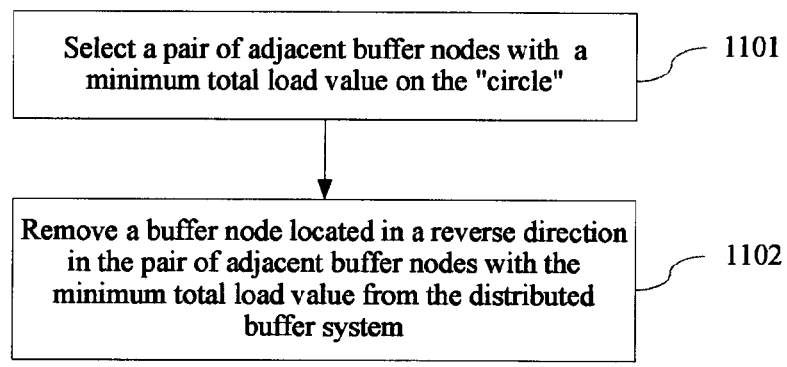
FIG. 11 is a flow chart of a method for removing a buffer node according to Embodiment 5 of the present invention.

Specifically, a procedure of removing a buffer node onto the "circle" is as shown in FIG. 11, and includes:

1101: Select a pair of adjacent buffer nodes with a minimum total load value on the circle, for example, node 2 and node 3 in FIG. 12.

1102: Remove a buffer node located in a reverse direction in the pair of adjacent buffer nodes with the minimum total load value from the distributed buffer system. After a period of time, the removed buffer node is set to be in, for example, an off, standby, or ready state.

Figure 12:
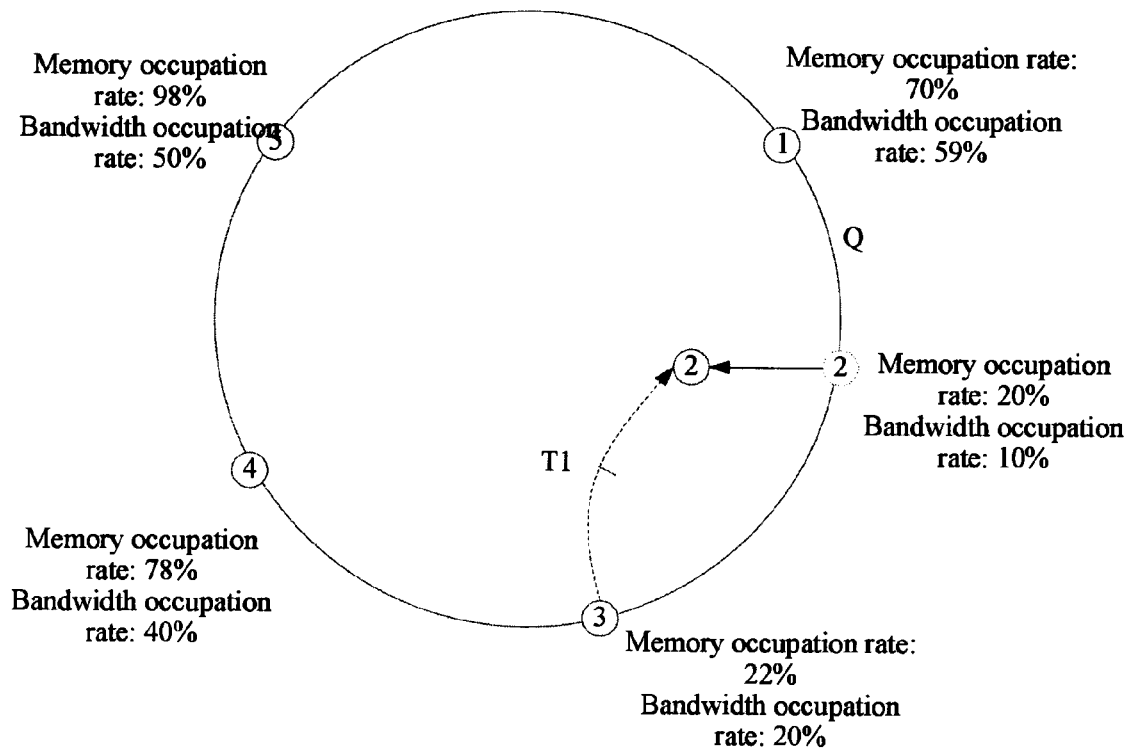
FIG. 12 is a schematic structural diagram of a virtual circle of a distributed buffer system according to Embodiment 5 of the present invention.

Referring to a structure of the "circle" in the distributed buffer system shown in FIG. 12, the pair of adjacent buffer nodes with the minimum total load value is node 2 and node 3, and node 2 is located in a counterclockwise direction of node 3. After node 2 is removed, a hash segment Q originally falling within coverage of node 2 totally falls within coverage of node 3. In this way, as the number of the buffer nodes is decreased, an average load of all nodes in the current distributed buffer system is increased, that is, an overall load of the current distributed buffer system is increased, so that the current system maintains in a specified balanced state.

If the problem of underload still exists in the current distributed buffer system after one node is removed from the "circle", the foregoing operations may be repeated till the overall load in the distributed buffer system is higher than a lower limit.

However, in the distributed buffer system, once the layout of the buffer nodes is changed, a case in which data of a hash segment on the "circle" is lost when being visited may occur.

In view of this problem, in this embodiment, a buffer management apparatus sends a notification message to a new buffer node corresponding to the hash segment with data to be lost, where the notification message includes location information of an old buffer node that corresponds to the hash segment with data to be lost. The location information includes an IP address and a port number of the old buffer node, and may definitely further include some other information for indicating the location.

With reference to the case in FIG. 12, after removing node 2, the hash segment Q originally falling within the coverage of node 2 totally falls within the coverage of node 3. In this case, when requesting for acquiring data on the hash segment Q, a buffer client may initiate a read operation request to node 3; however, the data on the hash segment Q is actually still saved in node 2 rather than node 3, and therefore the data on the hash segment Q may be lost.

In this embodiment, after node 2 is removed, the buffer management apparatus in the distributed buffer system may send a notification message to node 3, where the notification message includes location information of node 2 (which generally refers to an IP address and a port number). In this way, when the buffer client requests for acquiring the data on the hash segment Q from node 3, if the corresponding data does not exist in node 3, node 3 may visit node 2 according to the location information to acquire the corresponding data (although node 2 is removed from the "circle", addressing may still be performed on node 2 according to the location information), saves the acquired data in node 3, and at the same time, returns the data to the buffer client initiating the read operation request.

The notification message may further carry timeout period information, and therefore the operation of node 3 visiting node 2 to acquire the data is restricted in the timeout period. If the operation of acquiring the data is still not completed after the timeout period is expired, node 3 stops the procedure of visiting node 2 to acquire the data.

Furthermore, a range of the hash segment Q may be added in the notification message; in this case, when the buffer client requests for acquiring the data from node 3 while the corresponding data does not exist in node 3, node 3 may perform a consistent hashing operation on a key of the data, and compares a hash value obtained through the operation with the range of the hash segment Q carried in the notification message, to judge whether the hash value calculated by node 3 falls within the range of the hash segment Q; and if yes, node 3 can visit node 2 to acquire the corresponding data. Through adding the range information of the hash segment Q in the notification message, it may be further clarified that the data that node 3 needs to acquire from node 2 is the data corresponding to the hash segment Q with data to be lost, rather than data of another hash segment, which may reduce signaling consumption and save resources.

In the foregoing description, the initiating, by the buffer client, the read operation request to node 3 is merely used as an example, if node 3 receives a count request, and a corresponding count value does not exist in the local node, a previously recorded count value may also be acquired by visiting node 2; and a basic principle of this processing procedure is the same as that of the procedure for processing the read operation request, which is not repeated herein.

In the method for scheduling distributed buffer resources provided in this embodiment, when the underload exists in the current distributed buffer system, the loads borne by different buffer nodes is changed by removing a buffer node, and an average load of all the buffer nodes is increased, that is, an overall load of the distributed buffer system is increased, so that the distributed buffer system is in a balanced state.

Moreover, this embodiment further provides a solution for reducing losses of buffered data, in which the location information of the old buffer node that corresponds to the hash segment with data to be lost is informed to the new buffer node corresponding to the hash segment, so that the new buffer node can visit the old buffer node according to the location information to acquire the corresponding data, thereby reducing cases of data loss.

When a load equalization operation is performed a practical distributed buffer system, the solutions provided in Embodiment 3, Embodiment 4, and Embodiment 5 are not independent, and one of the solutions, or a combination of two or three of the solutions may be preferably adopted, to achieve a better effect.

In addition, in Embodiment 3, Embodiment 4, and Embodiment 5, if a write operation request is involved, the buffer management apparatus also needs to inform location information of the new buffer node to the old buffer node while informing the location information of the old buffer node that corresponds to the hash segment with data to be lost to the new buffer node.

In this way, when the buffer client initiates a write operation request to the new buffer node, the new buffer node may receive and save data required to be written by the buffer client; then judges whether the received data belongs to the hash segment with data to be lost; if yes, the new buffer node may forward the data to the old buffer node according to the location information of the old buffer node for synchronization. Likewise, when receiving the data that belongs to the hash segment with data to be lost, the old buffer node may also forward the data to the new buffer node according to the location information of the new buffer node for synchronization, so as to implement write synchronization between the new and the old buffer nodes corresponding to the same hash segment.

The procedure of the write synchronization may be restricted to be performed in a timeout period. If the operation of performing the write synchronization on the data is still not completed when the timeout period expires, the new buffer node may also stop the procedure of data synchronization.

Through the write synchronization performed on the new and the old buffer nodes corresponding to the same hash segment, a problem that reading and writing for the same "key" is not on the same buffer node after the position of the buffer node is changed may be avoided.

In the embodiments, the solutions provided in the embodiments of the present invention are described with the clockwise direction of the "circle" as the forward direction. However, using the clockwise direction as the forward direction of the "circle" is only an example in the embodiments of the present invention. If the counterclockwise direction is used as the forward direction of the "circle", that is, the buffer node for saving data is selected according to the counterclockwise direction, a basic principle of a procedure for performing load equalization with the counterclockwise direction as the forward direction is the same as that of the solution with the clockwise direction as the forward direction, which also falls within the protection scope of the present invention.

Embodiment 6

Figure 13:
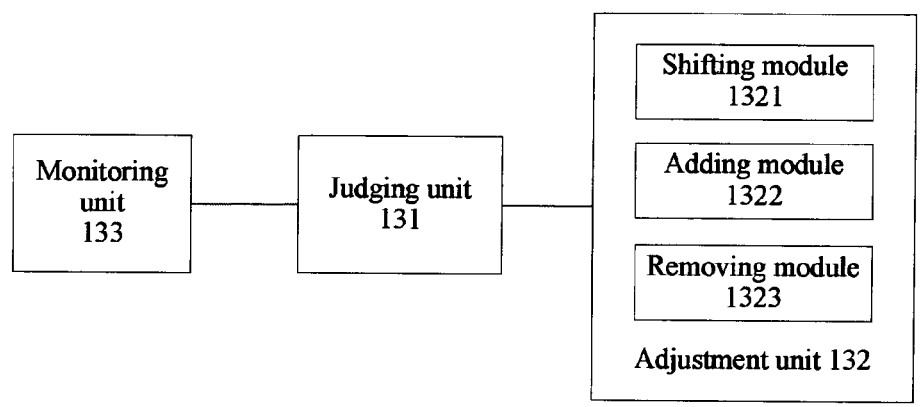
FIG. 13 is a schematic structural diagram of a buffer management apparatus according to Embodiment 6 of the present invention.

Corresponding to the foregoing method embodiments, in one aspect, this embodiment provides a buffer management apparatus configured to schedule distributed buffer resources, which, as shown in FIG. 13, includes a judging unit 131, an adjustment unit 132, and a monitoring unit 133, where the monitoring unit 133 is configured to monitor a load value of each buffer node in a distributed buffer system;

the judging unit 131 is configured to judge whether a load exception exists in the current distributed buffer system according to the load value, where the load exception includes load imbalance, overload, or underload; and the adjustment unit 132 is configured to adjust a layout of the buffer nodes in the distributed buffer system when the load exception exists in the current distributed buffer system.

Similar to the foregoing method embodiments, in the distributed buffer system in this embodiment, each buffer node is distributed on a "circle" that is based on a consistent hashing algorithm, and a direction from a key of data to a buffer node saving the data is used as a forward direction of the virtual circle. In this case, the adjustment unit 132 includes:

a shifting module 1321, configured to shift a location of a buffer node on the virtual circle; and/or an adding module 1322, configured to add a buffer node on the virtual circle; and/or a removing module 1323, configured to remove a buffer node from the virtual circle.

Figure 14:
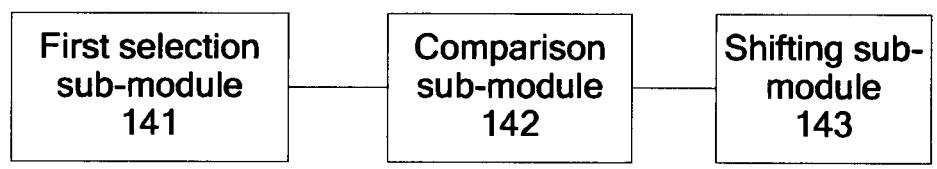
FIG. 14 is a schematic structural diagram of a shifting module in the buffer management apparatus according to Embodiment 6 of the present invention.

Specifically, as shown in FIG. 14, the shifting module 1321 may include:

a first selection sub-module 141, configured to select at least one pair of adjacent buffer nodes with a maximum load difference on the virtual circle;

a comparison sub-module 142, configured to compare load values of the two buffer nodes in each selected pair of adjacent buffer nodes; and a shifting sub-module 143, configured to shift a buffer node located in a reverse direction along the forward direction when a load value of a buffer node located in the forward direction in each selected pair of adjacent buffer nodes is greater; and shift the buffer node along the reverse direction when a load value of the buffer node located in the reverse direction is greater.

Figure 15:
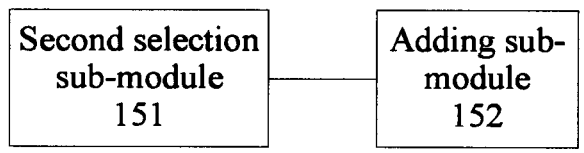
FIG. 15 is a schematic structural diagram of an adding module in the buffer management apparatus according to Embodiment 6 of the present invention.

As shown in FIG. 15, the adding module 1322 may include:

a second selection sub-module 151, configured to select a buffer node with a maximum load value on the virtual circle; and an adding sub-module 152, configured to add a buffer node at a middle location of a hash segment that corresponds to the buffer node with the maximum load value.

Figure 16:
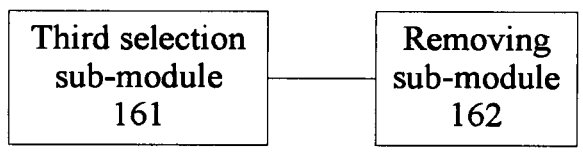
FIG. 16 is a schematic structural diagram of a removing module in the buffer management apparatus according to Embodiment 6 of the present invention.

As shown in FIG. 16, the removing module 1323 may include:

a third selection sub-module 161, configured to select a pair of adjacent buffer nodes with a minimum total load value on the virtual circle; and a removing sub-module 162, configured to remove a load node located in the reverse direction in the pair of adjacent buffer nodes with the minimum total load value from the distributed buffer system.

Figure 17:
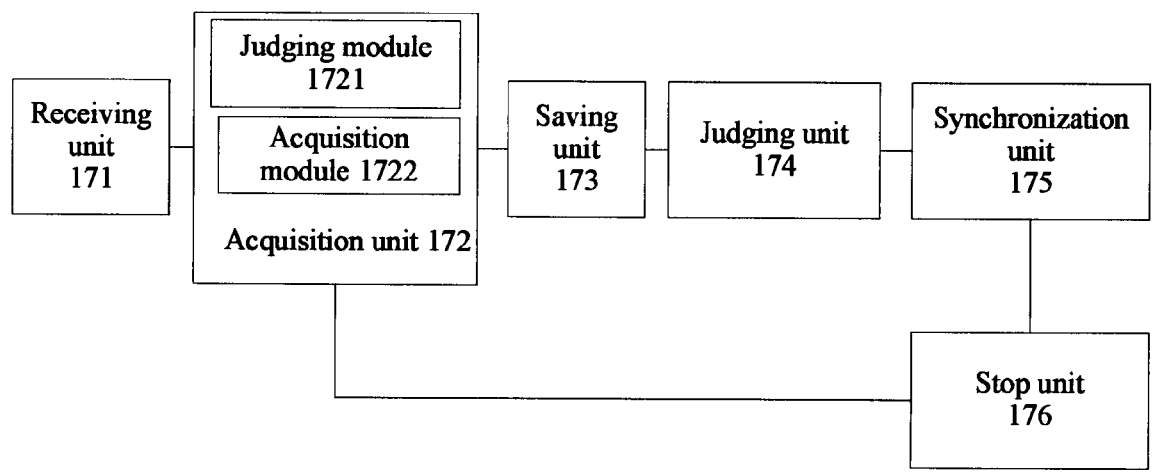
FIG. 17 is a schematic structural diagram of a buffer node according to Embodiment 6 of the present invention.

In another aspect, this embodiment further provides a buffer node. As shown in FIG. 17, the buffer node includes:

a receiving unit 171, configured to receive a notification message sent by a buffer management apparatus, where the message includes location information of an old buffer node that corresponds to a hash segment with data to be lost on a virtual circle of a distributed buffer system; and an acquisition unit 172, configured to visit the old buffer node according to the location information when data to be read by a buffer client does not exist on the current buffer node, to acquire and save the data;

where the hash segment with data to be lost is a hash segment with a buffer node to which the hash segment belongs changed after adjustment of a layout of buffer nodes occurs on the virtual circle of the distributed buffer system.

Furthermore, the notification message received by the receiving unit 171 further includes: a range of the hash segment with data to be lost; in this case, the acquisition unit 172 may include:

a judging module 1721, configured to judge whether a hash value corresponding to a key of the data to be read by the buffer client belongs to the hash segment with data to be lost when the data to be read by the buffer client does not exist on the current buffer node; and an acquisition module 1722, configured to visit the old buffer node according to the location information to acquire and save the data when a judging result of the judging module is yes.

If the current distributed buffer system further involves a write operation, the buffer node in this embodiment may further include:

a saving unit 173, configured to receive and save data required to be written by the buffer client or the old buffer node;

a judging unit 174, configured to judge whether a hash value corresponding to a key of the data required to be written by the buffer client belongs to the hash segment with data to be lost; and a synchronization unit 175, configured to synchronously write the data required to be written by the buffer client onto the old buffer node when a judging result of the judging unit is yes.

In addition, if the notification message received by the receiving unit 171 further includes timeout period, the buffer node in this embodiment further includes:

a stop unit 176, configured to stop an operation of data acquiring or data synchronization when the timeout period is expired.

Figure 18:
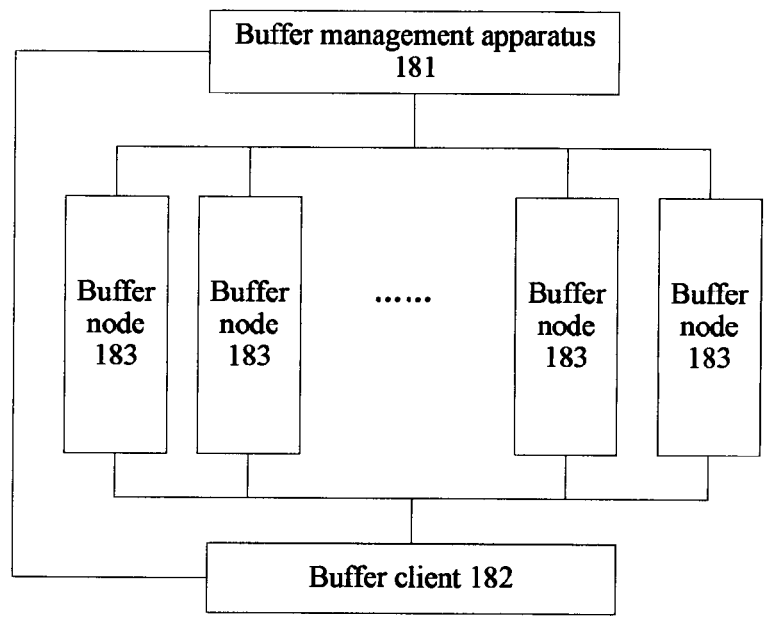
FIG. 18 is a schematic structural diagram of a distributed buffer system according to Embodiment 6 of the present invention.

Moreover, this embodiment further provides a distributed buffer system. As shown in FIG. 18, the distributed buffer system includes a buffer management apparatus 181, a buffer client 182, and multiple buffer nodes 183, where the buffer client 182 is configured to distribute data onto the multiple buffer nodes 183 according to a consistent hashing algorithm; and the buffer management apparatus 181 is configured to monitor a load value of each of the buffer nodes 183 in the distributed buffer system, judge whether a load exception exists in the current distributed buffer system according to the load value; and if the exception exists, adjust a layout of the multiple buffer nodes 183, where the load exception includes load imbalance, overload, or underload.

Furthermore, the buffer management apparatus 181 is further configured to send a notification message to a new buffer node corresponding to a hash segment with data to be lost on a virtual circle of the distributed buffer system after completing the layout adjustment of the buffer nodes 183, where the notification message includes location information of an old buffer node that corresponds to a hash segment with data to be lost on the virtual circle of the distributed buffer system. In this way, the new buffer node can visit the old buffer node according to the location information when data to be read by the buffer client does not exist in the current buffer node, to acquire and save the data, where, the hash segment with data to be lost is a hash segment with a buffer node to which the hash segment belongs changed after the adjustment of the layout of buffer nodes occurs on the virtual circle of the distributed buffer system.

In the apparatus and the system for scheduling distributed buffer resources provided in this embodiment, when the load exception exists in the current distributed buffer system, the loads borne by different buffer nodes is changed by shifting the position of a buffer node on the structure of the virtual circle of the distributed buffer system, or by adding a buffer node onto or removing a buffer node from the structure of the virtual circle, so as to implement automatic scheduling of resource distribution in the distributed buffer system and enable the resource distribution of the distributed buffer system to be in a balanced state. Moreover, in the solutions provided in this embodiment, the location information of the old buffer node that corresponds to the hash segment with data to be lost is informed to the new buffer node corresponding to the hash segment, so that the new buffer node can visit the old buffer node according to the location information to acquire the corresponding data, thereby reducing cases of data loss.

Through the foregoing description about the implementation manners, it is clear to persons skilled in the art that the present invention may be accomplished through software in addition to a necessary hardware platform, or absolutely through hardware. Based on such understanding, the foregoing technical solutions or the part that makes contributions to the prior art can be substantially embodied in a form of a software product. The computer software product may be stored in a storage medium such as a Read Only Memory/Random Access Memory, a magnetic disk, or an optical disk, and contain several instructions to instruct a computer equipment (for example, a personal computer, a server, or a network equipment) to perform the methods described in the embodiments or in some parts of the embodiments of the present invention.

The foregoing descriptions are merely specific embodiments of the present invention, but are not intended to limit the protection scope of the present invention. Changes or replacements readily apparent to persons skilled in the prior art within the technical scope of the present invention should fall within the protection scope of the present invention. Therefore, the protection scope of the present invention is subject to the appended claims.

What is claimed is:

1. A method for scheduling distributed buffer resources within a distributed buffer system, the distributed buffer system comprising a buffer management node and multiple buffer nodes for storing data, and the method comprising:

distributing, by the buffer management node, the multiple buffer nodes on a virtual circle that is based on a consistent hashing algorithm, wherein each buffer node covers a hash segment on the virtual circle;

determining, by the buffer management node, a home buffer node of data to be stored according to a home hash segment, wherein the home hash segment corresponds to a hash value of a key of the data to be stored;

saving, by the buffer management node, the data to be stored on the home buffer node;

determining, by the buffer management node, a load imbalance which exists in the distributed buffer system according to load values of the multiple buffer nodes;

selecting, by the buffer management node, at least one pair of adjacent buffer nodes with a maximum load difference on the virtual circle from the existing multiple buffer nodes on the virtual circle; and moving a location of the selected buffer nodes to change hash segment coverage of the selected buffer nodes.

2. The method according to claim 1, wherein if a difference between a maximum value and a minimum value in the load values of the multiple buffer nodes exceeds a threshold, the load imbalance exists in the distributed buffer system.

3. The method according to claim 1, wherein the moving by the buffer management node, the location of the selected buffer nodes of the multiple buffer nodes on the virtual circle, comprising:

moving, by the buffer management node, a buffer node located in a reverse direction in a selected pair of adjacent buffer nodes along a forward direction, when a load value of a buffer node located in the forward direction in the at least one selected pair of adjacent buffer nodes is greater than a load value of the buffer node located in a reverse direction in the at least one selected pair of adjacent buffer nodes; and moving the buffer node located in the reverse direction in the at least one selected pair of adjacent buffer nodes along the reverse direction, when the load value of the buffer node located in the reverse direction in the at least one selected pair of adjacent buffer nodes is greater than the load value of the buffer node located in the forward direction in the at least one selected pair of adjacent buffer nodes;

wherein a direction from a hashing value of a key of data to a buffer node saving the data is used as the forward direction of the virtual circle.

4. The method according to claim 3, wherein a distance by which the buffer node located in the reverse direction is moved is:

$$M \cdot \frac{X}{1+X} \cdot \frac{m-n}{m}$$

wherein M is length of a hash segment that corresponds to a buffer node with a comparatively high load in one pair of adjacent buffer nodes; m and n are respectively load values corresponding to the buffer node with a comparatively high load and a buffer node with a comparatively low load; and X is a multiple of a load capacity of the buffer node with lower load value to a load capacity of the buffer node with greater load value.

5. A buffer management node in a distributed buffer system the buffer management node is configured to:

distribute multiple buffer nodes on a virtual circle that is based on a consistent hashing algorithm, wherein each buffer node covers a hash segment on the virtual circle, determine a home buffer node of data to be stored according to a home hash segment, wherein the home hash segment corresponds to a hash value of a key of the data to be stored, and save the data to be stored on the home buffer node, and the buffer management node further comprising:
a judging unit, which determines a load imbalance exists in the distributed buffer system according to load values of the multiple buffer nodes; and
an adjustment unit, which selects at least one pair of adjacent buffer nodes with a maximum load difference on the virtual circle from the existing multiple buffer nodes on the virtual circle, and moves a location of at least one buffer node to change hash segment coverage of the at least one buffer node.

6. The buffer management node according to claim 5, wherein the adjustment unit
configured to move a buffer node located in a reverse direction in a selected pair of adjacent buffer nodes along a forward direction, when a load value of a buffer node located in the forward direction in the selected pair of adjacent buffer nodes is greater than a load value of the buffer node located in the reverse direction in the selected pair of adjacent buffer nodes, and move the buffer node located in the reverse direction in the selected pair of adjacent buffer nodes along the reverse direction, when the load value of the buffer node located in the reverse direction in the selected pair of adjacent buffer nodes is greater than the load value of the buffer node located in the forward direction in the selected pair of adjacent buffer nodes;
wherein a direction from a hashing value of a key of data to a buffer node saving the data is used as the forward direction of the virtual circle.

7. A method for scheduling distributed buffer resources within a distributed buffer system, the distributed buffer system comprising a buffer management node and multiple buffer nodes for storing data, and the method comprising:
distributing by the buffer management node, the multiple buffer nodes on a virtual circle that is based on a consistent hashing algorithm, wherein each buffer node covers a hash segment on the virtual circle;
determining by the buffer management node, a home buffer node of data to be stored according to a home hash segment, wherein the home hash segment corresponds to a hash value of a key of the data to be stored;
saving by the buffer management node, the data to be stored on the home buffer node;
adjusting by the buffer management node, a layout of the multiple buffer nodes on the virtual circle, in order to change hash segment coverage of at least one buffer node of the multiple buffer nodes;
determining by the buffer management node, a first hash segment on the virtual circle, wherein the first hash segment is covered by an old buffer node of the multiple buffer nodes before an adjusting of the layout, and covered by a new buffer node within the buffer distributed resources of the multiple buffer nodes after the adjusting of the layout;
sending by the buffer management node, a notification message to the new buffer node, wherein the notification message comprises location information of the old buffer node;
receiving, by the new buffer node, the notification message sent by the buffer management node; and
visiting by the new buffer node, the old buffer node according to the location information of the old buffer node to acquire a first data, wherein a hash value of a key of the first data belongs to the first hash segment, and the old buffer node store the first data before the adjusting of the layout.

8. The method according to claim 7, wherein the notification message further comprises: a range of the first hash segment, and judging, by the new buffer node, whether the hash value of the key of the first data belongs to the first hash segment according to the range of the first hash segment; and
if yes, performing by the new buffer node, the visiting step to acquire the first data from the old buffer node.

9. The method according to claim 8, further comprising:
receiving by the new buffer node, a second data to be written;
judging by the new buffer node, whether a hash value of a key of the second data belongs to the first hash segment according to the range of the first hash segment; and
if yes, writing the second data on the new buffer node and the old buffer node.

10. The method according to claim 7, wherein the notification message further comprises a timeout period; and the method further comprises:
stopping an operation of data acquiring or data synchronous when the timeout period expires.

11. A distributed buffer system, comprising a buffer management node and multiple buffer nodes; wherein
the buffer management node, configured to:
distribute the multiple buffer nodes on a virtual circle that is based on a consistent hashing algorithm, wherein each buffer node covers a hash segment on the virtual circle,
determine a home buffer node of data to be stored according to a home hash segment, wherein the home hash segment corresponds to a hash value of a key of the data to be stored, save the data to be stored on the home buffer node,
adjust a layout of the multiple buffer nodes on the virtual circle, in order to change hash segment coverage of at least one buffer node of the multiple buffer nodes,
determine a first hash segment on the virtual circle, wherein the first hash segment is covered by an old buffer node of the multiple buffer nodes before an adjusting of the layout and covered by a new buffer node of the multiple buffer nodes after the adjusting of the layout, and
send a notification message to the new buffer node comprising location information of the old buffer node;
wherein the new buffer node, configured to:
receive the notification message sent by the buffer management apparatus, and visit the old buffer node according to the location information of the old buffer node to acquire a first data,
wherein a hash value of a key of the first data belongs to the first hash segment, and the old buffer node store the first data before the adjusting of the layout.

12. The distributed buffer system according to claim 11, wherein the notification message further comprises: a range of the first hash segment, and the new buffer node, configured to:
judge whether the hash value of the key of the first data belongs to the first hash segment according to the range of the first hash segment, and
perform the visiting step to acquire the first data from the old buffer node when the hash value of the key of the first data belongs to the first hash segment.

13. The distributed buffer system according to claim 12, the new buffer node, configured to:
receive a second data to be written,
judge whether a hash value of a key of the second data belongs to the first hash segment according to the range of the first hash segment, and write the second data on the new buffer node and the old buffer node when the hash value of the key of the second data belongs to the first hash segment.

14. The distributed buffer system according to claim 11, wherein the notification message further comprises a timeout period; and the new buffer node, configured to stop an operation of data acquiring or data synchronous when the timeout period expires.

* * * * *